March 3, 1970    W. C. HYND    3,498,778
GLASS STIRRER WITH COOLING MEANS
Filed Jan. 4, 1967    2 Sheets-Sheet 1

INVENTOR

March 3, 1970   W. C. HYND   3,498,778
GLASS STIRRER WITH COOLING MEANS
Filed Jan. 4, 1967   2 Sheets-Sheet 2
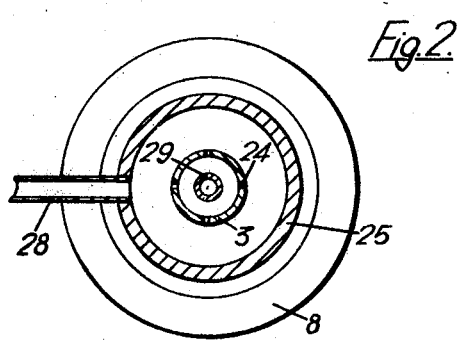
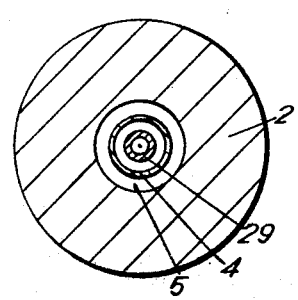
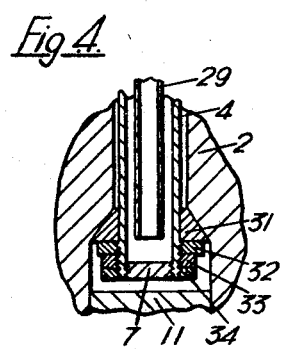
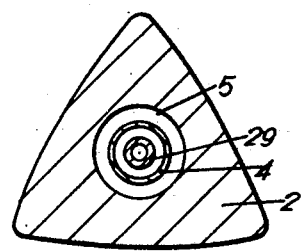
INVENTOR
William Christie Hynd
BY
Morrison, Kennedy, Campbell
ATTORNEYS United States Patent Office 3,498,778
Patented Mar. 3, 1970

3,498,778
GLASS STIRRER WITH COOLING MEANS
William Christie Hynd, Liverpool, England, assignor to Pilkington Brothers Limited, Liverpool, England, a corporation of Great Britain
Filed Jan. 4, 1967, Ser. No. 607,264
Claims priority, application Great Britain, Jan. 6, 1966, 685/66
Int. Cl. C03b 5/18
U.S. Cl. 65—178                         3 Claims

ABSTRACT OF THE DISCLOSURE

Stirring apparatus for stirring high temperature liquid comprises an elongated hollow refractory body and a fluid cooled axial reinforcement including a driving tube for the stirrer, and the refractory body being held axially on the axial reinforcement by end collars threaded onto the driving tube, the collar adjacent the bottom end of the refractory body being housed within a recess in said bottom end of the refractory body.

---

Figure 1:
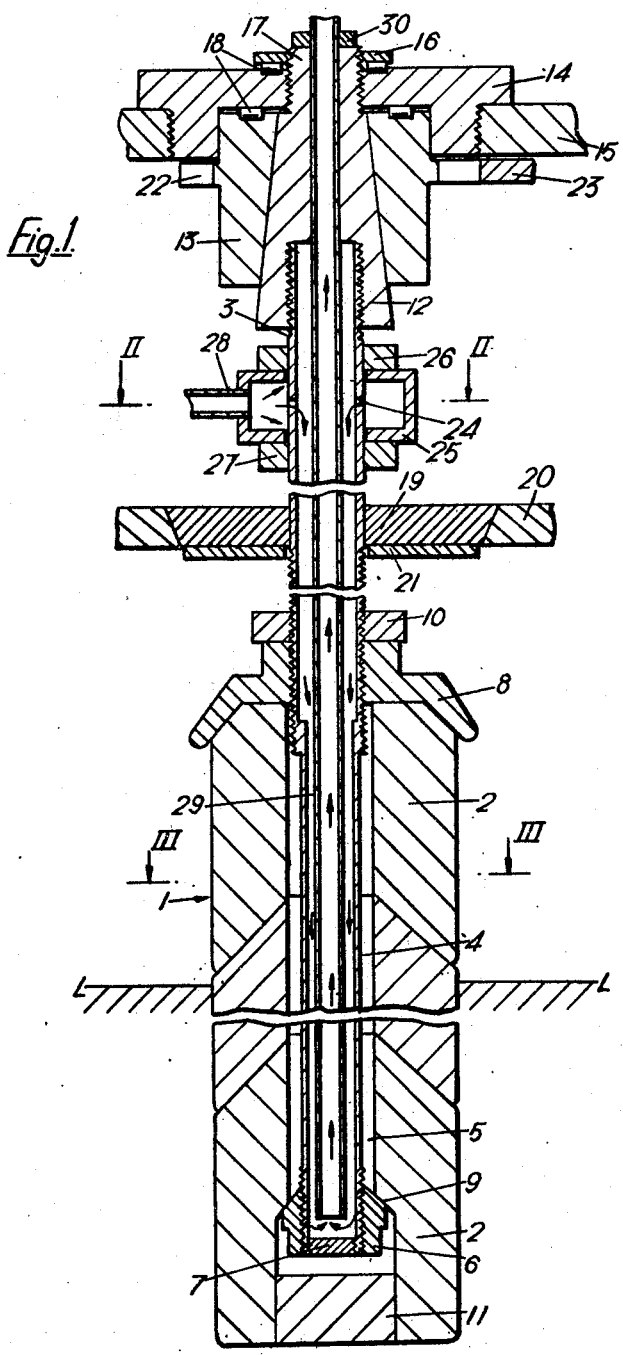

This invention relates to apparatus for stirring liquids at high temperatures and has especial application to the stirring of molten glass.

The main object of the present invention is to provide a stirrer of refractory material which is interiorly reinforced so as to maintain requisite rigidity at elevated temperatures and thus can be employed for stirring viscous liquids at high temperatures, especially molten glass.

Stirring apparatus constructed according to the present invention comprises, in combination, an elongated refractory body and a fluid cooled axial reinforcement housed within the refractory body, said refractory body having a high resistance to transmission of heat inwardly from a high temperature liquid being stirred by the body and the fluid cooling system absorbing heat from the refractory body constituting the housing.

It will be appreciated that the elongated refractory body will be resistant to chemical or physical attack by the liquid to be stirred, either by being made of resistant material or coated with resistant material, as hereinafter exemplified.

The elongated refractory body may be for example cylindrical or of a prismatic shape or of other shape having uniform cross-section. For certain applications the refractory body may be of elliptical cross-section.

In the preferred embodiment of the present invention, the axial reinforcement is in the form of co-axial tubes one being connected to the supply and the other used as a discharge duct for the cooling medium, said co-axial tubes being arranged in spaced relation with each other and with the refractory body constituting the housing for the axial reinforcement, the inner of the co-axial tubes opening near the bottom of the outer tube and the bottom of the outer tube being closed.

From another aspect, stirring apparatus constructed according to the present invention comprises, in combination, an elongated refractory body and an axial reinforcement in the form of a tubular structure comprising a driving tube closed at the bottom end and adapted to be operatively connected at the top end with a driving head, said driving tube being apertured at a level above the refractory body for admission of cooling fluid, and associated at the said level with a box for feeding cooling fluid into the driving tube, and an inner tube in spaced relation with the bottom end of the driving tube and with the wall of the driving tube, said inner tube extending upwardly beyond the top of the driving tube to discharge the cooling fluid supplied through the box.

Preferably a construction according to the invention includes an external shoulder at the bottom end of the said driving tube, a sectionalised refractory body comprising a plurality of nesting sections threaded on the driving tube and seated on the shoulder and clamping means carried by the driving tube and superimposed on the nesting sections to hold the said nesting sections to the said shoulder.

In the preferred construction according to the invention the driving head of the stirrer comprises a tapered centering block drivingly connected to the driving tube and suspended from a support for the stirrer, a complementary driving block frictionally engaging the centering block, said driving block carrying driving means geared to power means for operating the stirrer.

In order that the invention may be more clearly understood some preferred embodiments of stirring apparatus will now be described, by way of example, with reference to the accompanying diagrammatic drawings in which:

FIGURE 1 is a central vertical section of stirring apparatus in accordance with the present invention, FIGURE 2 is a horizontal section through the stirring apparatus shown in FIGURE 1 taken on the line II—II thereof, FIGURE 3 is a horizontal section through the stirring apparatus shown in FIGURE 1 taken on the line III—III thereof, FIGURE 4 is a detail of a central vertical section showing an alternative arrangement of the shoulder formation at the bottom end of the stirring apparatus, and FIGURE 5 is a horizontal section through stirring apparatus according to the present invention in which the refractory body is triangular in cross-section.

In the drawings like reference numerals designate the same or similar parts.

Referring first to FIGURES 1 to 3 of the drawings, the stirring apparatus comprises a stirrer having a sectionalised elongated hollow refractory body 1 of cylindrical form comprising annular sections indicated at 2 each having a smooth outer surface. The abutting faces of the sections 2 are formed as matching conical surfaces so that the sections 2 nest together in axial alignment and there is a large area of contact between adjacent sections. The refractory body is mounted on, and constitutes a housing for, a water cooled axial reinforcement, which reinforcement constitutes the means by which the rotation is imparted to the stirrer.

The axial reinforcement is a tubular structure comprising a driving tube 3 of heat resistant steel to which tube rotation is imparted as hereinafter explained. The driving tube 3 has a lower part, indicated at 4, having a reduced diameter which is less than the internal diameter of the bore of the annular refractory sections 2 of the stirrer so as to give considerable clearance from the tube part 4 when the sections 2 are threaded thereover as the stirrer is assembled, and ultimately to define an insulating air jacket between the tube part 4 and the internal wall 5 of the bore through the refractory sections 2.

The lower end of the tube part 4 is closed by a ferrule 6 of heat resistant steel which is threaded onto the tube part 4 and includes a removable end plug 7. The top surface of the ferrule 6 is formed as a conical shoulder and the lowermost refractory section 2 is formed with a co-operating shoulder 9 which seats onto the ferrule shoulder. The stirrer is operatively connected to the driving tube 3 by a clamping cap 8 of heat resistant steel which is threaded onto the driving tube 3, and when screwed down is seated on the top stirrer section 2 and clamps down the sections of the hollow refractory body 1 onto the ferrule 6. The cap 8 is secured in position on the driving tube 3 by a locking nut 10, and the stirrer is completed by a plug 11 inserted in the bottom of the lowermost section 2 of the stirrer.

The upper end of the driving tube 3 is secured in a tapered centering block 12 which frictionally engages a driving block 13. A support plate 14 for the stirrer is carried on a bridge indicated at 15 which is adapted to straddle a container for molten glass in which glass the stirrer is operating.

A nut 16 engages a threaded shank 17 of the centering block 12, and roller bearings 18 are interposed between the nut 16 and the upper side of support plate 14 and between the driving block 13 and the lower side of the support plate 14. The nut 16 holds the tapered centering block 12 in frictional engagement with the driving block 13, and the stirrer is suspended vertically from the support plate 14 on the roller bearings 18 and is able to rotate to the plate 14.

Additional support for the stirrer is provided by a carbon bush 19 in the roof 20 of the glass container, and a refractory tile 21 serves to protect the bush 19 from the heat in the container.

The driving power is applied to the driving tube 3 through the driving block 13 which is provided with teeth 22 meshing with a power driven toothed wheel indicated at 23. Thus centering block 12 and the driving block 13 constitute a driving head for the driving tube 3 and power to rotate the stirrer 1 at the requisite speed is transmitted from the wheel 23 through the driving block 13 and tapered centering block 12 to the tube 3 and to the stirrer sections 2 axially clamped on the reduced diameter tubular part 4 of the driving tube 3.

The stirrer, in having a smooth outer face imparts motion to the molten mass to improve the uniformity of the mass, while vertical displacement of the glass is substantially eliminated.

The part 4 of the driving tube, which part is within the bore of the stirrer, is cooled by a cooling fluid, for example water. The tube 3 is apertured above the stirrer as indicated at 24 about which apertures 24 a box 25 is secured on the tube 3 and axially located thereon by sealing collars 26 and 27 threaded onto the tube 3. A pipe 28 connects the box 25 to a source of supply (not shown) of cooling fluid.

Thus the box 25 constitutes a junction box between the supply and the exterior of the tube 3. Cooling water entering the tube 3 passes downwardly towards the ferrule 6 and then rises up an innermost coaxial tube 29 which tube has its lower end within the ferrule and extends up through the tapered centering block 12. A nut 30 on tube 29 abuts the top of centering block 12 to define the vertical disposition of tube 29. The tube 29 is connected to a discharge conduit (not shown).

The water may, if desired, be circulated in the opposite direction through the coaxial tubes in the apparatus shown in the drawings.

During rotation of the stirrer in molten glass, water continually flows down the tube 4 to cool the latter and thereby maintains its normal strength in spite of the stirrer elements being surrounded by molten glass, and as already explained the tube part 4 is additionally protected against heat from the molten glass by the refractory body 1 and by the insulating air jacket defined in the bore of the stirrer. Accordingly the requisite stiffness for the refractory stirrer is produced on assembly and maintained in operation.

In operation the stirring apparatus is preheated before being inserted into the molten glass in the glass container, and because of the differences in expansion between the refractory material of the stirrer and the heat resistant steel of which the tube 4 is made some adjustment of the clamping cap 8 may be necessary, and further adjustment may be necessary when the stirrer is inserted into the glass container and heated to operational temperature, but such adjustments as become necessary will be small because of the temperature differences which will be maintained between the axial reinforcement and the refractory body by the cooling fluid.

The apparatus is inserted into the molten glass in the container from above, and the stirrer is not wholly inserted in molten glass, so that some part of the stirrer, e.g., the uppermost section 2 of the stirrer is above the liquid level LL indicated in FIGURE 1 in order to retain the metal part of the apparatus well out of contact with the molten glass.

When stirring molten glass the cylindrical refractory body has an outside temperature at or about the temperature of the molten glass being stirred, the refractory body has high resistance to the transmission of heat therethrough, the core is cooled by the cooling fluid and, therefore, serves to remove heat from the bore of the refractory body and the result is that the core can be maintained at a low temperature, and can therefore be made of low temperature materials, and simultaneously the inner bore region of the refractory material is maintained at lower temperature than the external regions of the stirrer, so that loss of mechanical strength of the refractory body is minimised.

Most refractory materials soften and thereby suffer a loss in mechanical strength at the temperature of molten glass and it is for these reasons that stirrers of refractory material have very short lives.

By providing the fluid cooled core according to the present invention the core affords mechanical support to the refractory material and further affects cooling of the inner parts of the refractory material to increase the mechanical strength thereof. Accordingly, constructions according to the present invention enable a refractory stirrer to withstand stirring stresses in combination with the stresses induced by the flows of the molten glass.

Two or more stirrers constructed in accordance with the present invention may be arranged in spaced relation across the glass container, depending on the width of the container.

By a construction according to the present invention a stirrer is constructed capable of standing up to the mechanical forces exerted by flow in the container for the molten glass including thermal currents induced in large volumes of molten glass held at high temperature both by convection and by tapping off quantities from the container.

The cylindrical refractory body 1 may be made from bubbled alumina which is a particularly effective insulator, but where bubbled alumina is used it is coated with platinum to avoid the interaction which would otherwise occur between the bubbled alumina and the molten glass. Alternatively the refractory body may be made of sillimanite, which does not interact significantly with molten glass and accordingly does not normally require a protective coating. Sillimanite, however, is not such an effective insulator as is bubbled alumina, and accordingly a cylindrical body of sillimanite must be thicker than one made of bubbled alumina, unless in a particular installation it is feasible to use a correspondingly greater flow of cooling fluid to maintain the axial reinforcement at a sufficiently low temperature to retain its mechanical strength.

The refractory stirrer body 1 is capable of remaining chemically stable when immersed in molten glass, and though not of itself capable of standing up to the mechanical stresses induced when stirring molten glass for any appreciable time, is made sufficiently stiff for continued operation by the axial reinforcement, which in turn is made capable of retaining its mechanical strength by the insulation afforded by the refractory material used and heat transfer provided by the cooling system.

A stirrer constructed according to the present invention is stable at the temperature of the molten liquid in which it operates and has the mechanical strength to withstand the mechanical forces exerted on it by the liquid, especially molten glass.

To prevent any contamination of the glass the stirrer may be sheathed in a coating of platinum or other suitable metal which is stable to the molten glass and heat resisting.

Instead of circulating water, cooled air may be used as the cooling fluid. The cooled air may be supplied down the inner tube 29, and after flowing up the tube 4 escapes through the holes 24. If the air is used in this way the box 25 is not used.

Referring now to FIGURE 4 which shows a modification of the clamping of the lowermost refractory section 2 against the ferrule, in this construction according to the invention a composite ferrule is used and comprises a tapered collar 31, a clamping ring 32 and locking rings 33 and 34 as well as an end plug 7.

Instead of driving the stirrer as hereinbefore described the stirrer may be actuated by a drive through the periphery of the flanged member 8 direct to the refractory body.

In yet another stirrer according to the invention the bore through the annular refractory sections 2 is hexagonal and the driving tube 4 is of matching hexagonal cross-section although of smaller dimensions than the bore. When driving torque is applied there is line contact of the angles of the hexagonal tube with the surfaces of the hexagonal bore and there is a positive drive from the tube 4 to the refractory sections 2 along these lines of contact. The air gap between the tube 4 and the inner wall 5 of the bore retains its thermal insulation properties.

FIGURE 5 of the drawings shows a cross-section through a stirrer similar to that shown in FIGURE 1, but in which the cross-sectional shape of the outside wall of the refractory body is triangular.

I claim:

1. Stirring apparatus for stirring high temperature liquid comprising an elongated, hollow refractory body, driving means for the refractory body which driving means comprises a downwardly extending driving tube closed at its bottom end and having a driven connection at its top end, said driving tube extending axially within the refractory body, an inner tube within the driving tube in spaced relation therewith and having an opening near the bottom end of the driving tube, and means for connecting one of said tubes to a supply of cooling medium, the driving tube and the inner tube thereby providing a fluid cooled axial reinforcement for the refractory body, wherein the improvement comprises top and bottom end collars threaded onto the driving tube and holding the refractory body axially thereon, and said refractory body being formed with a recess in which said bottom end collar is housed.

2. Stirring apparatus according to claim 1, wherein said refractory body is of constant external cross-section throughout its length and comprises a plurality of separate sections nested together.

3. Stirring apparatus according to claim 1, wherein said refractory body is formed of bubbled alumina coated externally with platinum.

References Cited

UNITED STATES PATENTS

| | | | |
|---|---|---|---|
| 1,502,068 | 7/1924 | Soubier | 65—178 |
| 2,022,223 | 11/1935 | Taylor | 65—178 XR |
| 2,038,190 | 4/1936 | Morton | 65—178 XR |
| 2,061,367 | 11/1936 | Morton | 65—178 XR |

FRANK W. MIGA, Primary Examiner

U.S. Cl. X.R.

65—345, 356